(12) United States Patent
Fink

(10) Patent No.: US 8,434,361 B2
(45) Date of Patent: May 7, 2013

(54) SENSOR COMPONENT

(75) Inventor: Thomas Fink, Landshut (DE)

(73) Assignee: Schott AG (DE)

( * ) Notice: Subject to any disclaimer, the term of this patent is extended or adjusted under 35 U.S.C. 154(b) by 659 days.

(21) Appl. No.: 12/622,377

(22) Filed: Nov. 19, 2009

(65) Prior Publication Data

US 2010/0186501 A1  Jul. 29, 2010

(51) Int. Cl.
G01D 11/24 (2006.01)

(52) U.S. Cl.
USPC ............................................................ 73/431

(58) Field of Classification Search .................... 73/431; 204/26
See application file for complete search history.

(56) References Cited

U.S. PATENT DOCUMENTS

| 5,367,264 A * | 11/1994 | Brabetz .......................... 324/674 |
| 7,030,629 B1 * | 4/2006 | Stahlmann et al. ............ 324/663 |
| 7,111,519 B2 * | 9/2006 | Dille ......................... 73/861.355 |
| 7,644,623 B2 * | 1/2010 | Yokura et al. .................... 73/726 |
| 2005/0121323 A1 * | 6/2005 | Hartl et al. ..................... 204/409 |
| 2007/0056365 A1 * | 3/2007 | Stahlmann ................... 73/170.09 |
| 2007/0261473 A1 * | 11/2007 | Weyl et al. .................... 73/23.31 |
| 2008/0202249 A1 * | 8/2008 | Yokura et al. .................... 73/726 |
| 2010/0132206 A1 * | 6/2010 | Seidel ............................. 33/354 |
| 2011/0259107 A1 * | 10/2011 | Reiche ............................ 73/633 |

FOREIGN PATENT DOCUMENTS

| DE | 6920808 | 11/1969 |
| DE | 20306095 | 8/2003 |
| DE | 10228428 | 1/2004 |
| JP | A-H10-73494 | 3/1998 |
| JP | A-2004-53373 | 2/2004 |

* cited by examiner

Primary Examiner — Lisa Caputo
Assistant Examiner — Jamel Williams
(74) Attorney, Agent, or Firm — Pitts & Lake, PC

(57) ABSTRACT

A leadthrough with a sensor section comprising a component section or tube section with a component wall thickness or tube wall thickness and least one sensor section for accommodating a sensor with a sensor wall thickness. The leadthrough with a sensor section is characterized in that the sensor wall thickness is smaller than half the component wall thickness or the tube wall thickness.

38 Claims, 3 Drawing Sheets

US 8,434,361 B2

SENSOR COMPONENT

CROSS-REFERENCE TO RELATED APPLICATIONS

This application claims benefit of German application DE 10 2008 058 071.6 filed on Nov. 19, 2008 in the German Patent Office. The content of German application DE 10 2008 058 071.6 is hereby incorporated by reference in its entirety.

STATEMENT REGARDING FEDERALLY-SPONSORED RESEARCH OR DEVELOPMENT

Not Applicable

BACKGROUND OF THE INVENTION

The invention relates to a sensor component, comprising a component section with a component wall and at least one sensor section for accommodating a sensor with a sensor wall, with the component wall having a component wall thickness and the sensor wall having a sensor wall thickness.

Different types of sensors are used in the state of the art, e.g., temperature sensors, which detect the physical properties of a medium, e.g., a fluid or a gas. The medium whose physical properties such as the temperature are to be detected is guided in a conduit system for example or is stored in a container such as a tank for example.

Up until now, sensors were arranged on the side of the leadthrough which lies close to the medium, which means close to the fluid or gas, for the purpose of a rapid detection of the physical quantities such as the temperature.

A sensor which is arranged in such a way is subjected to the medium, which means the fluid or the gas. If a system is concerned where a certain pressure is built up, the sensors are also subjected to the pressures. Such an arrangement is especially problematic when the media concern aggressive media such as acids and/or high pressures prevail in the systems. Expensive special sensors need to be used in such cases on the leadthrough with a so-called arrangement of the sensors on the media side.

A further disadvantage of sensors arranged on the media side can be seen in such a way that that sensors arranged in this manner are not accessible or only with difficulty in the event of defects. Calibration is also only possible with much effort.

As an alternative to the arrangement of the sensors on the media side, sensors such as temperature sensors can also be arranged on the outside wall of a vessel, e.g., a tank or a conduit.

The problem arises in an arrangement outside of the medium that there is imprecision in the measurements. There is a further problem in that in the arrangement of a sensor on the outside wall of the conduit or the tank for example any changes in temperature can be detected only very imprecisely. One reason is the large thermal mass of the conduit or the tank, leading to high inertia and preventing the detection of temperature changes occurring very rapidly.

Instead of the arrangement on the outside wall of the conduit or the tank, the sensors could also be inserted in a special sensor housing in the conduit, with the sensor being arranged in the sensor housing on the side averted from the media.

Such an arrangement has been described for example in U.S. Pat. No. 5,367,264.

The sensor known from U.S. Pat. No. 5,367,264 is used to determine the percentage by volume of a substance in the mixture of two substances. U.S. Pat. No. 5,367,264 discloses especially a sensor with which a temperature of a medium can be measured which flows through a tube or its precise composition.

A further sensor is known from US 2005/0121323A1, with which the concentration of additives or impurities in oil are to be determined.

The sensor according to US 2005/0121323A1 comprises a housing part which is connected with a conduit in such a way that an electrode is accommodated in a hermetically sealed manner by the housing part. Temperature measurement is not disclosed in US 2005/0121323A1, and also no other kinds of sensors.

BRIEF SUMMARY OF THE INVENTION

It is thus the object of the invention to provide a sensor component with which high precision and rapid response characteristic can be achieved in the measurements of physical properties of flowing media. Furthermore, the sensor component should have sufficient stability, especially in the region of the sensor section.

This object is achieved in accordance with the invention in such a way that one sensor component comprises a component section with a component wall thickness S and a sensor section with a sensor wall thickness, and the wall thickness of the sensor section is only half, preferably only ⅓, of the wall thickness of the component section. As a result of this special geometrical shape and dimensioning of the leadthrough, it is possible to arrange sensors such as temperature sensors in the region of the sensor section on a side of the sensor component which is averted from the media and, despite this arrangement, to achieve high precision and very rapid response of the sensor to a change of the physical quantities such as in a medium for example. As a result of the thinner arrangement of the sensor section in relation to the component section, the response characteristic of the sensor to fluctuations of physical quantities such as the temperature is increased. It is necessary for reasons of stability on the other hand that the wall thickness in the region of the sensor section is at least ¹⁄₁₀₀ of the wall thickness of the component section. In a preferred embodiment, the wall thickness of the component section is between 10 mm and 1 mm, preferably between 4 mm and 1 mm, especially between 2 mm and 1 mm. The wall thickness in the sensor section preferably lies between 0.01 mm and 1 mm, especially between 0.1 mm and 1 mm.

Preferably, the leadthrough in the component section is made of steel, special steel, especially special steel 1.4301, special steel 1.4306, special steel 1.4307 or special steel 1.4404. It is also possible that the component section of the leadthrough consists of KOVAR, a Ni/Fe/Co alloy or a Ni/Fe alloy.

It is possible in a first embodiment of the invention that the component is made as an integral component preferably from one and the same material.

The integral arrangement can be produced especially simple and cost-effectively, e.g., by means of a punching process, in which the sensor section is punched out as a depression with lower wall thickness.

As an alternative to an integral arrangement, the component can also be arranged in two parts. The component section forms a first separate component and the sensor section forms a second separate component.

In a first arrangement of the two-part embodiment, the sensor section can be arranged as a drawn part which is preferably made of a material which is characterized by favorable properties with respect to the signal to be sensed. For example, the material of the drawn part can be chosen in such a way that it consists of a thermally especially well conductive material in the case of use for a temperature sensor. In addition to the materials of steel, special steel, Ni/Fe/Co alloys, Ni/Fe alloys which can also be used for the component section, it is also possible to use Ni, Cu/Ni/Zn alloys, so-called German silver, especially also Cu and Cu alloys and molybdenum for the drawn part.

When the leadthrough comprises a temperature sensor, a thermally especially well-conductive material is preferably used in the region of the drawn part. Copper, alloys which contain copper, or special steels are considered as materials for the drawn part.

The separate drawn part is connected with the component section by brazing, soldering or welding and produces the leadthrough. The welding can occur with the help of laser welding, electron-beam resistance welding or resistance seam welding.

A thermally especially preferred embodiment of a multipart, especially two-part, sensor component is one in which the sensor section is not connected in a thermally conductive manner with the component section such as by brazing, soldering or welding the drawn part in the case of connecting for example, but the connection of sensor section and component section occurs in a thermally decoupled manner. This is possible when the sensor section itself is arranged as a type of housing part, e.g., in the form of a cup, and the housing part with the component section is fitted in glass, which means it is connected with the help of glass. The connecting agent of glass between the housing part and the component section leads to the consequence that the two sections are thermally decoupled. In the case of a change in temperature, merely the inertia of the relatively small housing part is relevant for the temperature sequence. Such an embodiment is therefore especially preferred when conductivities and/or capacities of fluids are to be measured with the help of sensors.

In the measurement of conductivities and/or capacities and/or the temperature, it is advantageously provided that the sensor section comprises a partial sensor section which is similar to the component section in regard to its shape and is arranged within the component section. For example, the component section can be a tube section and the partial sensor section of the sensor section can be a tube with a smaller diameter which is then disposed within the tube section of the component section.

The sensor component in accordance with the invention can also comprise one or several leadthrough sections for leads, especially electrical leads which are preferably arranged in the region of the component section.

Leadthroughs for electrical leads are especially preferable for example. In this case, the electrical lead of the leadthrough section is fitted in glass in the component section again.

In addition to the sensor component in accordance with the invention, the invention also provides an apparatus for receiving and/or conducting fluid or gaseous media with such a sensor component.

Gases are considered as media whose physical properties can be measured in the conduit or container with the help of the sensor component. Especially natural gas is considered as a gas, both in the gaseous as well as compressed or fluid form or as liquefied petroleum gas. Industrial gases such as hydrogen, N2, O2, especially also in liquid form such as liquid hydrogen and liquid nitrogen, can also be measured. Furthermore, exhaust gases from internal combustion engines and process gases of the chemical and semiconductor industry and air can be measured with respect to their physical properties.

Further media which can be measured in the conduits or containers with respect to their physical properties with the help of the sensor components in accordance with the invention are especially water, salt water, oils which are used by engine transmissions and in the area of hydraulics, alcohols, especially methanol and ethanol, especially also as admixtures to fuels. Further fluids whose physical properties can be measured with the help of the leadthrough in a sensor device in accordance with the invention are especially fuels such as gasoline and diesel fuel, rapeseed-oil methylesther, and fuels for airplane turbines. Fluid substances for exhaust gas purification such as urea or urea solutions which are currently used for the purification of exhaust gases of diesel engines can be detected with the help of the leadthrough in accordance with the invention in a conduit or a container. Moreover, any kind of process fluid in the industry, especially in the chemical industry and semiconductor industry, can be sensed with the help of the leadthrough in accordance with the invention with a conduit or a tank. Media that are used in air-conditioning systems or refrigerators such as fluorinated hydrocarbons can be detected with the help of the leadthrough in accordance with the invention.

The listing of the gases or fluids which can be detected with the help of the apparatus in accordance with the invention is merely exemplary and shall not be understood to be limiting in any way.

Different types of sensors can be used in the apparatus in accordance with the invention. The use of humidity sensors allows measuring the filling level in containers, especially fuel tanks for example.

Measurement of the temperature with temperature sensors like pressure sensors or capacitive sensor or the electric conductivity is possible. The leadthroughs can be inserted in conduits which are used for example in the chemical industry or in the construction of airplanes or cars.

The sensor component in accordance with the invention is used especially preferably in fuel lines, especially for determining the composition of fuel mixtures.

Especially punching where the depression has already been introduced in the region of the sensor section in the case of integral embodiments, cold and hot working, fine blanking, deep drawing, precision casting, metal-cutting and hydroforming are considered as production methods for the component section of the sensor component or for the integral leadthrough.

In the case of a multi-part, especially two-part, embodiment of the invention in which the sensor section is arranged as a drawn part, it can be obtained by deep drawing or hydroforming for example. The production methods for the housing part which is used as a sensor section can be the same methods as those for producing the component section or the entire leadthrough in the case of an integral embodiment.

BRIEF DESCRIPTION OF THE SEVERAL VIEWS OF THE DRAWINGS

The invention is now explained in closer detail by reference to an example shown in the drawings, without any limitations imposed thereon, wherein.

DETAILED DESCRIPTION OF THE INVENTION

Figure 1A:
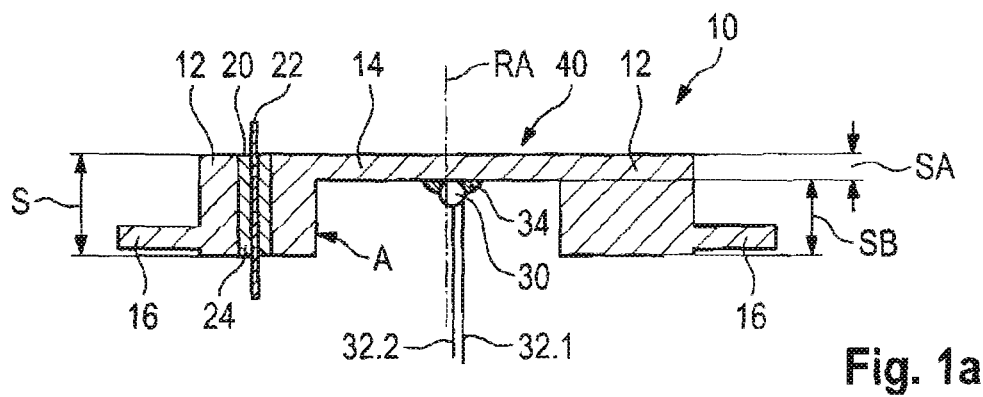
FIG. 1a shows a first embodiment of an integral sensor component with a leadthrough.

FIG. 1a shows a first embodiment of a sensor component 10 in accordance with the invention. The sensor component 10 is shown in a sectional view. The illustrated embodiment concerns a rotationally symmetrical component, with the section shown in FIG. 1a being rotated about the rotational axis RA, resulting in a three-dimensional rotationally symmetrical component in the form of a cylinder.

Other three-dimensional components in the form of a cuboid would be possible for example.

In the illustrated embodiment, sensor component 10 comprises a component section 12 and a sensor section 14. The component section 12 has a thickness or component section wall thickness S.

The sensor component shown in FIG. 1a can be further machined from a round blank by metal-cutting by turning or milling in such a way that an offset with a depth SB is milled by metal-cutting out of the blank. The component thickness S is thus reduced in the region of the sensor section 14 by the depth SB. The following relationship applies:

$$SA = S - SB, \text{ with} \qquad (1)$$

S: designating the total thickness of the component or the component section wall thickness, SB: designating the depth of the depression to be milled, and SA: designating the resulting sensor wall thickness or thickness in the region of the sensor section 14.

It is generally shown in FIG. 1a that the sensor section wall thickness SA is substantially smaller than the component section wall thickness S. Preferably, the sensor section wall thickness SA is only half as large as the component section wall thickness S. In a preferred embodiment is it even only ⅓ of the component wall thickness. In order to ensure the necessary stability in the region of the sensor section, the sensor section wall thickness is preferably more than ¹⁄₁₀₀ of the component section wall thickness. Preferably, the component section wall thickness S is in the range of 1 mm to 10 mm and the sensor section wall thickness SA is in the range of 0.1 mm to 1 mm.

Furthermore, the sensor component comprises an edge 16 which is used to rigidly connect the sensor component 10 with a wall of a container, e.g., a tank or a conduit.

A leadthrough 20 is further provided in the embodiment in FIG. 1a in the region of the component section 12, through which a conduit 22 can be guided. Conduit 22 is fitted in glass in the leadthrough 20 with a glass material for example or any other suitable material 24.

Several such leadthroughs with conduits led through the same can be provided.

A sensor 30 such as a temperature sensor is further shown in the region of the sensor section 14, which sensor rests directly on the sensor section wall 14 of the sensor section wall thickness SA. The signal detected by the sensor is transmitted via lines 32.1, 32.2 to a controller for example. NTC sensors or sensors which respond to infrared radiation, so-called infrared sensors, can be used as temperature sensors for example.

In order to improve thermal conductivity and thus the response characteristics also on the medium side 40 of the leadthrough when installed in a container or a conduit, it can be provided that the temperature sensor 30 is connected with the material of the sensor section 14 by a conductive paste, e.g., an epoxy resin paste 34.

Figure 1B:
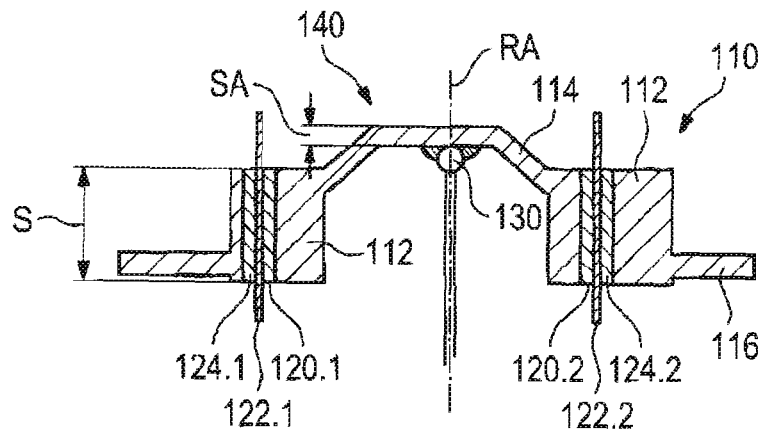
FIG. 1b shows a second embodiment of an integral version of the invention with two leadthroughs.

FIG. 1b shows an alternative arrangement of the embodiment according to FIG. 1a. The same components are designated with a reference numeral increased by 100. The component shown in FIG. 1b can be obtained in such a way for example the sensor section 114 is punched out with a substantially thinner wall thickness SA then the wall thickness of the component itself by means of a punching process from the full material of the sensor component.

As in FIG. 1a, the embodiment according to FIG. 1b comprises leadthroughs, namely leadthroughs 120.1, 120.2 which can be guided through conduits 122.1, 122.2 to the media side 140 of the sensor component 110.

Figure 2:
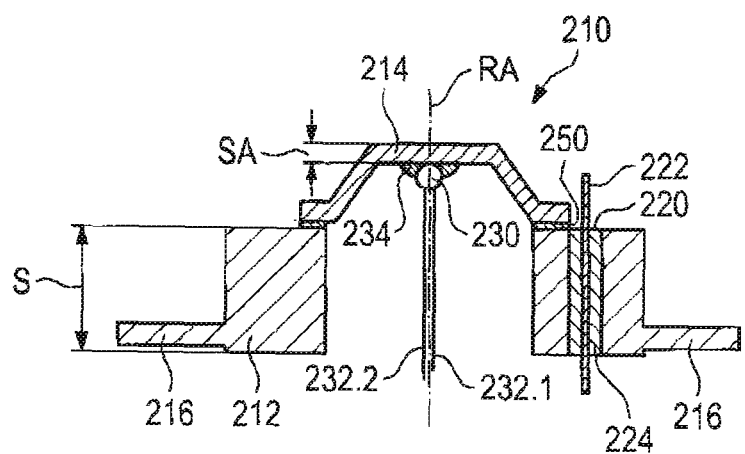
FIG. 2 shows a two-part embodiment of the sensor component with a drawn part as a sensor section.

FIG. 2 shows a further embodiment of the invention. In the embodiment shown in FIG. 2, the sensor section 214 is arranged as a separate component as a so-called drawn part, e.g., by deep drawing or hydroforming. The same components as in FIG. 1a are designated with a reference numeral increased by 200. The drawn part comes with the advantage that it can also be produced from materials such as nickel, German silver, copper or copper alloys or also molybdenum. A sensor section 214 made of such a material offers the advantage of an especially good thermal conductivity in comparison with one made of steel according to an integral embodiment according to FIGS. 1a and 1b.

The drawn part 214 is connected at point 250 with the component section 212, e.g., by brazing, soldering or even welding, especially laser welding, electron-beam welding, resistance or wall-seam welding.

The embodiment according to FIG. 2 further shows a leadthrough 220 through which a conduit 222 is guided. The material with which the bore and the conduit are tightly sealed with each other can be a glass material or even a ceramic material.

Figure 3:
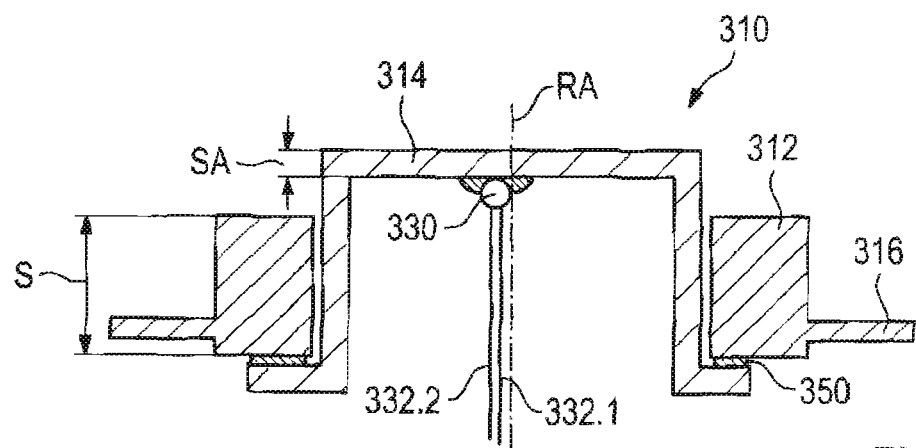
FIG. 3 shows a two-part embodiment of the invention with a container as a sensor section without leadthroughs.

In the arrangement as a drawn part, the sensor section can also be arranged as an individual component. For example, the drawn part can form a rotational body, a so-called housing part. Such an embodiment is shown in FIG. 3. All components which have the same function as in the preceding embodiments are designated with reference numerals which are increased by 300 in comparison with FIG. 1. Sensor section 314 is arranged in this case as a housing part in the form of a cup for example. The cup on its part is connected at point 350 with the component section 312 by brazing or welding for example. It can clearly be seen in FIG. 3 that, as already shown in FIG. 2, the drawn part 214, as well as the housing part 314, has a wall thickness SA which is considerably smaller than the thickness or wall thickness S of the component section.

The embodiment in FIG. 2 further shows a sensor 330 which is connected with an evaluation device via lines 332.1, 332.2.

The same components as in FIG. 1a are designated with a reference numeral which is increased by 300.

Figure 4:
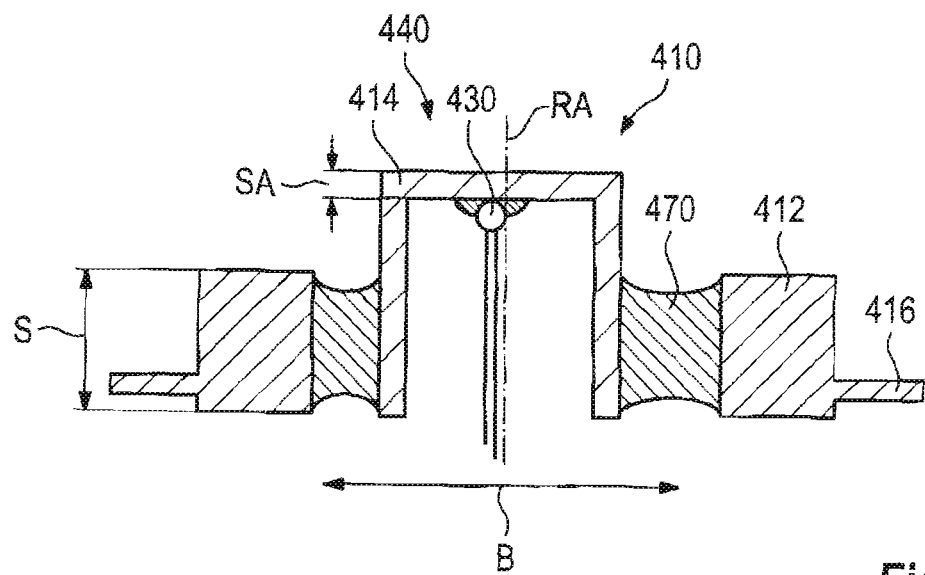
FIG. 4 shows a two-part embodiment with a container as a sensor section, with the container being connected with the component section by fitting in glass.

An alternative embodiment of a multi-part, especially two-part, embodiment in which the sensor section 414 is arranged as a separate housing part is shown in FIG. 4. In this case, the sensor section or the housing part 414 with the component section 412 of the sensor component is not connected by soldering but fitted in glass in a bore which was introduced in the component section 412 with a width B. The fitting in glass is designated with reference numeral 470.

It is also clearly shown that the wall thickness SA of housing part 414 is substantially smaller than the wall thickness S of component section 412.

The fitting in glass, which produces the connection between sensor section 414 and the component section 412, is designated with reference numeral 470. The component shown in FIG. 4 concerns a component which is rotationally symmetrical about the axis RA, without being limited to this. The fitting in glass ensures that the sensor section 414 is thermally and electrically insulated from the component section 412. Moreover, the fitting in glass provides a hermetically sealed connection.

Figure 5A:
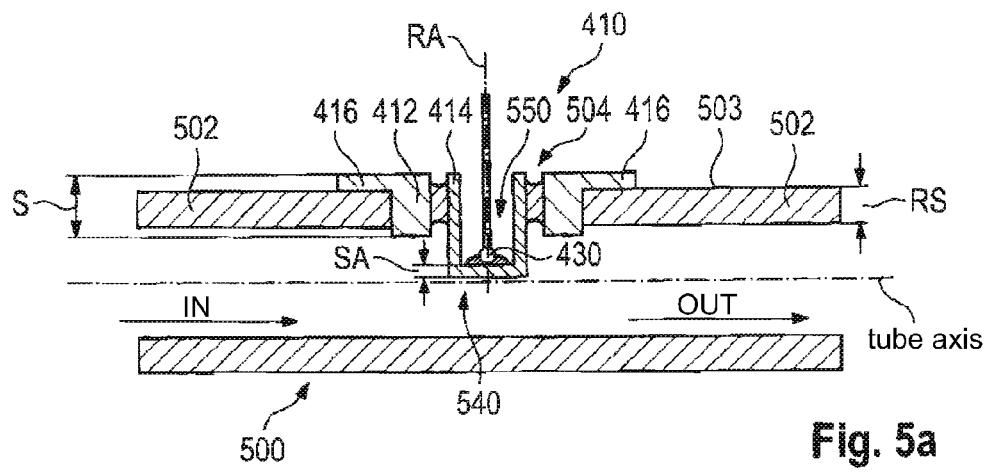
FIG. 5a shows an embodiment of a sensor component for introduction in a conduit.

FIG. 5*a* shows a multi-part sensor component 410 which is arranged in the form of a tube with an inlet side IN and an outlet side OUT. Such a tubular sensor component 410 can especially be used in a conduit, especially a fuel line, in a motor vehicle. Both gaseous media as well as fluid media can be transported through the tubular sensor component. The sensor section 414 is fitted in glass in the form of a separate housing, as described in FIG. 4, in the outside wall 502 of tube 500 in a recess 504. As is shown in FIG. 4, the fitting in glass in the embodiment shown in FIG. 5*a* does not occur directly in the tube 502 with wall thickness RS, but at first in a component section 412, with a component section wall thickness S. The housing part 414 comprises a partial housing wall thickness or a sensor section wall thickness SA.

The wall thickness S of the component section 412 corresponds in the present embodiment to approximately the wall thickness RS of the tube which is rotationally symmetrical about the tube axis.

As is shown in FIG. 5*a*, sensor 430 is arranged on the side 550 of the tube which is averted from the medium. The side of housing part 414 facing the medium is designated with reference numeral 540. It is advantageously prevented by arranging the sensor 430 on the side averted from the medium that the sensor is attacked by the medium. The installation and removal of the sensor in case of defects as well as calibration is facilitated by the fitting in glass. The connection between the component section 412 in which the housing part 414 is fitted in glass and the outside wall 502 of the tube 500 occurs by soldering in the region of edge 416 for example. A hermetically sealed connection is achieved by the soldered connection.

Figure 5B:
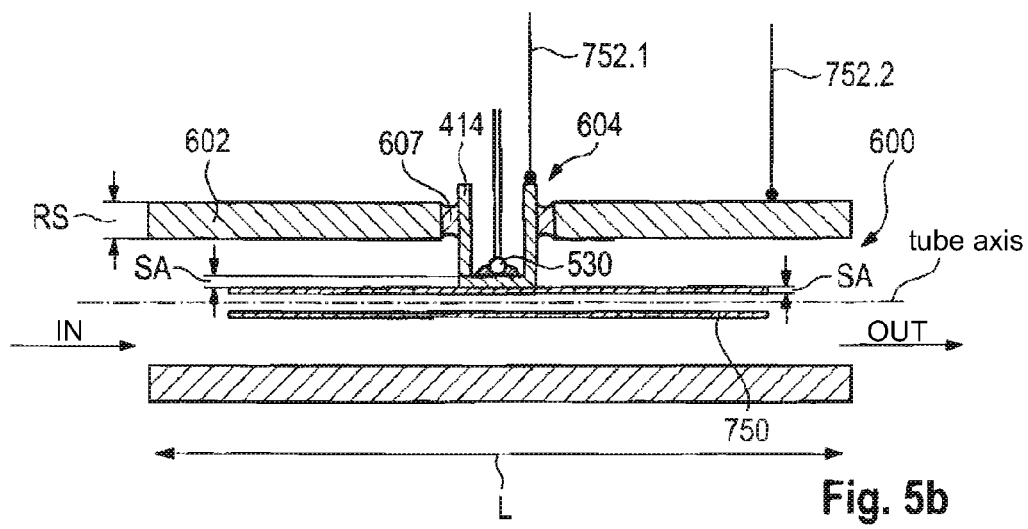
FIG. 5b shows an embodiment of a sensor component for introduction in a conduit with a partial sensor section arranged as a tube.
Figure 5C:
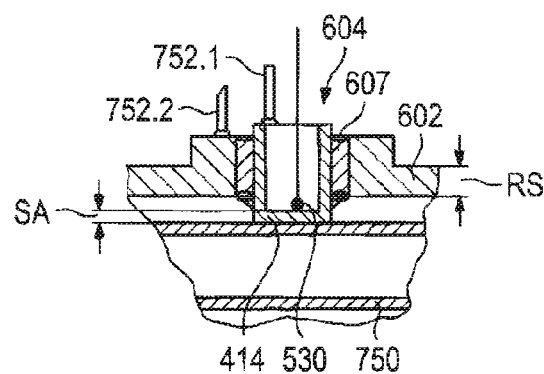
FIG. 5c shows a detailed view of the connection of the sensor section with an inside tube.

FIG. 5*b* shows an alternative embodiment of a tubular sensor component, as shown in FIG. 5*a*. The same components as in FIG. 5*a* are shown with a reference numeral increased by 100. In contrast to the embodiment according to FIG. 5*a*, the sensor section 414 is fitted in glass directly in an opening 604 embedded in the tube wall 602 in the embodiment according to FIG. 5*b*. As a result, the glass material rests directly between the outside wall 602 of the tube and the sensor section 414. The fitting in glass is designated with reference numeral 607. The thickness of the tube wall is RS, and the one of the sensor section is SA. In the present case, the thickness of tube wall RS is placed on equal footing with the previously used thickness of component section thickness S and the relationships established there also apply in this case. In addition to the direct fitting in glass in the tube wall, the embodiment according to FIG. 5*b* is also characterized in that the sensor section 414 is in direct connection with an inside tube 750 disposed in the tube 600. The inside tube 750 also has a very small wall thickness, preferably a wall thickness of the sensor section SA. The inside tube 750, with which the sensor section is connected, extends over at least half the length L of the sensor component 410 arranged as a tube. Numerous advantages can be achieved by introducing the inside tube 750. The inside tube ensures that there is a laminar flow in the tubular sensor component and no destruction of the flow occurs. Moreover, the heating surfaces which are in direct contact with the temperature sensor 530 within the sensor section are expanded or enlarged considerably. This improves the precision of temperature measurements of the medium which flows through the tubular sensor component. Moreover, it is provided in the embodiment according to FIG. 5*b* that the outside tube is placed on one potential and the inside tube to another potential. This ensures performing a capacitive measurement which offers information on the composition of the medium flowing through the tubular sensor component. By arranging the inside tube with parallel surfaces in relation to the outside tube, the capacitive surfaces are strongly increased and the capacitive measurement of flowing media in the tubular sensor section is improved. The connection between sensor section 414 and the inside tube is shown in detail in FIG. 5*c*. It also shows the lines 752.1, 752.2 with which capacitive measurements can be performed between the inside tube 750 and the outside tube 602. No leadthrough of electric leads as shown in FIG. 1*a* is provided in the embodiment according to FIG. 5*b*. This would still be possible however.

A very rapid and reliable measurement can be obtained in all embodiments by the sensor arranged on the side of the sensor component averted from the medium, the wall thickness SA is provided in a considerable thinner way in the region of the sensor section than the thickness of tube wall RS or in the region of the component section S.

Whereas the invention was described with reference to specific embodiments, many other variations and modifications and other uses are obvious to the person skilled in the art. The present invention is thus not limited to the specific disclosure, as is outlined in the description.

The invention claimed is:

1. A sensor component comprising a component section or tube section with a component wall thickness or tube wall thickness and at least one sensor section for accommodating a sensor with a sensor wall thickness wherein the sensor wall thickness is smaller than half the component wall thickness or the tube wall section, and the sensor component is arranged in the form of a tube, the tube having a recess which accommodates the sensor section.

2. A sensor component according to claim 1 wherein the sensor wall thickness is smaller than ⅓ of the component wall thickness or the tube wall section.

3. A sensor component according to claim 1 wherein the component section consists of one of the following materials: steel, special steel, Ni/Fe/Co alloys, Ni/Fe alloys.

4. A sensor component according to claim 1 wherein the sensor component is arranged in two parts.

5. A sensor component according to claim 4 wherein the sensor section is a drawn part.

6. A sensor component according to claim 5 wherein the drawn part consists of one of the following materials: steel, special steel, Ni/Fe/Co alloys, Ni/Fe alloys, Ni, Co/Ni/Zn alloys, Cu, Cu alloys, molybdenum.

7. A sensor component according to claim 5 wherein the drawn part is connected with the component by one of the following processes: brazing, soldering, welding.

8. A sensor component according to claim 4 wherein the sensor section is a housing part.

9. A sensor component according to claim 8 wherein the housing part consists of one of the following materials: steel, special steel, Ni/Fe/Co alloys, Ni/Fe alloys, Ni, Co/Ni/Zn alloys, Cu and Cu alloys, molybdenum.

10. A sensor component according to claim 8 wherein the housing part is connected with the component section by fitting in glass.

11. A sensor component according to claim 1 wherein the sensor component is provided with an integral arrangement.

12. A sensor component according to claim 11 wherein the sensor section is introduced by punching into the integral sensor component.

13. A sensor component according to claim 1 wherein the sensor which is accommodated by the sensor section is one or several of the following sensors: a humidity sensor, a pressure sensor, a capacitive sensor, a sensor for measuring electric conductivity, a temperature sensor.

14. A sensor component according to claim 1 wherein the sensor component comprises at least one leadthrough for an electric conductor.

15. A sensor component according to claim 14 wherein the leadthrough is arranged in the region of the component section.

16. A sensor component according to claim 1 wherein the sensor component in the form of a tube comprises an inside tube, with the inside tube being connected with the sensor section.

17. A sensor component according to claim 16, wherein the sensor component has two electric connections for a capacitive measurement, with a first connection being connected with the tube and a second connection with the inside tube.

18. An apparatus for accommodating and/or conducting a fluid or gaseous medium wherein the apparatus comprises at least one sensor component comprising a component section or tube section with a component wall thickness or tube wall thickness and at least one sensor section for accommodating a sensor with a sensor wall thickness wherein the sensor wall thickness is smaller than half the component wall thickness or the tube wall section, and the sensor component is arranged in the form of a tube, the tube having a recess which accommodates the sensor section.

19. The apparatus according to claim 18 wherein the fluid or gaseous medium is one of the following media: natural gas, hydrogen, nitrogen, oxygen, exhaust gases of internal combustion engines, industrial process gases, liquefied petroleum gas, water, especially salt water, oils, especially for motors, gearing and hydraulic applications, alcohols, especially methanol and ethanol, gasoline and diesel fuel, rape-seed oil methlyester, airplane turbine fuels, urea and urea solutions, fluorinated hydrocarbons.

20. A sensor component comprising:
a component section or tube section with a component wall thickness or tube wall thickness;
at least one leadthrough for an electric conductor; and
at least one sensor section for accommodating a sensor with a sensor wall thickness;
wherein the sensor wall thickness is smaller than half the component wall thickness or the tube wall section.

21. A sensor component according to claim 20 wherein the sensor wall thickness is smaller than ⅓ of the component wall thickness or the tube wall section.

22. A sensor component according to claim 20 wherein the component section consists of one of the following materials: steel, special steel, Ni/Fe/Co alloys, Ni/Fe alloys.

23. A sensor component according to claim 20 wherein the sensor component is arranged in two parts.

24. A sensor component according to claim 23 wherein the sensor section is a drawn part.

25. A sensor component according to claim 24 wherein the drawn part consists of one of the following materials: steel, special steel, Ni/Fe/Co alloys, Ni/Fe alloys, Ni, Co/Ni/Zn alloys, Cu, Cu alloys, molybdenum.

26. A sensor component according to claim 24 wherein the drawn part is connected with the component by one of the following processes: brazing, soldering, welding.

27. A sensor component according to claim 23 wherein the sensor section is a housing part.

28. A sensor component according to claim 27 wherein the housing part consists of one of the following materials: steel, special steel, Ni/Fe/Co alloys, Ni/Fe alloys, Ni, Co/Ni/Zn alloys, Cu and Cu alloys, molybdenum.

29. A sensor component according to claim 27 wherein the housing part is connected with the component section by fitting in glass.

30. A sensor component according to claim 20 wherein the sensor component is provided with an integral arrangement.

31. A sensor component according to claim 30 wherein the sensor section is introduced by punching into the integral sensor component.

32. A sensor component according to claim 20 wherein the sensor which is accommodated by the sensor section is one or several of the following sensors: a humidity sensor, a pressure sensor, a capacitive sensor, a sensor for measuring electric conductivity, a temperature sensor.

33. A sensor component according to claim 20 wherein the leadthrough is arranged in the region of the component section.

34. A sensor component according to claim 20 wherein the sensor component is arranged in the form of a tube, with the tube having a recess which accommodates the sensor section.

35. A sensor component according to claim 34 wherein the sensor component in the form of a tube comprises an inside tube, with the inside tube being connected with the sensor section.

36. A sensor component according to claim 35, wherein the sensor component has two electric connections for a capacitive measurement, with a first connection being connected with the tube and a second connection with the inside tube.

37. An apparatus for accommodating and/or conducting a fluid or gaseous medium wherein the apparatus comprises:
at least one sensor component comprising:
a component section or tube section with a component wall thickness or tube wall thickness,
at least one leadthrough for an electric conductor, and
at least one sensor section for accommodating a sensor with a sensor wall thickness,
wherein the sensor wall thickness is smaller than half the component wall thickness or the tube wall section.

38. The apparatus according to claim 37 wherein the fluid or gaseous medium is one of the following media: natural gas, hydrogen, nitrogen, oxygen, exhaust gases of internal combustion engines, industrial process gases, liquefied petroleum gas, water, especially salt water, oils, especially for motors, gearing and hydraulic applications, alcohols, especially methanol and ethanol, gasoline and diesel fuel, rape-seed oil methlyester, airplane turbine fuels, urea and urea solutions, fluorinated hydrocarbons.

* * * * *